Patented Apr. 23, 1940

2,198,198

UNITED STATES PATENT OFFICE 2,198,198

MODIFIED ANTIOXYGENIC MILK SOLIDS AND METHOD OF MAKING AND USING THE SAME

Sidney Musher, New York, N. Y., assignor to Musher Foundation Incorporated, New York, N. Y., a corporation of New York No Drawing. Application August 23, 1939 Serial No. 291,517

7 Claims. (Cl. 99—150)

The present invention relates to the preparation of a new anti-oxygenic material having milk solids as a base and possessing marked stabilizing and antioxygenic properties particularly when utilized for retarding oxidative deterioration of food products.

It is a purpose of the present invention to provide new modified milk serum solids or modified milk-solids-not-fat possessing marked stabilizing and antioxygenic properties which may be widely used to overcome oxidative deterioration of organic materials and particularly of food compositions subject to oxidative deterioration.

A further object is the retardation of oxidative deterioration by simple and economical means and through the use of the modified milk solids either as an additive product or in partial or complete replacement for ordinary milk solids normally used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used powdered skim milk or powdered milk-solids-not-fat, sometimes referred to as milk serum solids. Concentrated or condensed skim milk may less desirably be employed in place of powdered skim milk. Among other less preferable products that may be utilized as the base for or carrier of the antioxidant to produce the new modified antioxygenic compound are powdered buttermilk and powdered whey.

In accomplishing the above objects, the skim milk in powdered or concentrated form is prepared with a minor amount of the water soluble and less preferably the alcohol soluble extracts of unbleached, finely divided, dry milled cereals and grains, which include principally oats, barley and yellow or white maize or hominy, and also less preferably include rye, rice, wheat, buckwheat and tapioca.

The cereals may where desired be decorticated or degerminated before extraction. These cereals should not be sprouted, fermented, malted or boiled, nor should their starch, protein or gluten be substantially converted, solubilized, gelatinized, or dextrinized.

The preferred cereals are those which contain less than 0.75% total phosphorus and less than 10% of glyceride oil content, and they are preferably in a fine state of division. The cereals and particularly the oat, maize and barley cereals, and desirably their meal portions, and preferably in unbleached condition and dry milled and finely divided, give the highest yield of stabilizing activity in comparison with the other cereals when utilized with powdered skim milk.

The cereal may be dehulled and/or degerminated but for normal commercial manufacture, the hulls and/or germs may be allowed to remain as part of the cereal. The raw and unbleached by-products from the normal milling of these cereals are also included for extraction purposes.

The cereal such as finely divided whole oats should be mixed or agitated thoroughly with a quantity of water for 10 seconds to 1 hour. The water used should be substantially free of minerals and desirably free of iron and copper. Any quantity of water may be used to produce a free flowing mixture. For example, 1 part of oats may be mixed with 9 parts of water by weight. Other proportions may also be used such as from 5 to 25 parts of water to every 1 part of oats. The oat flour suspension should then be subjected to thorough agitation, preferably for a period of about 30 minutes.

It is particularly desirable for the water used for the extraction to be acidified to a pH of between 5.0 and 6.7 before the extraction. A pH of 6.0 is preferable and this adjustment will result in reduced tendency to fermentation during extraction, higher yields of extracted materials, cleaner separation of water soluble and insoluble materials and higher stabilizing value of the extract.

It is desirable for the temperature of the water at the time of extraction to be about 135° F. although room temperature is also satisfactory. After a 30 minute agitation period the solution should desirably be cooled by placing it in a jacketed or coiled vat or by running water through cooling coils immersed therein so that the temperature of the water is reduced to from 70° F. to 100° F.

It is not desirable for the extraction to be conducted at above 135° F. because of possibility of gelatinization or conversion of the starch present in the cereal.

The solution is then treated to remove the undissolved starch, fibrous and other cereal residues. This may be accomplished by allowing the mixture to settle for 2 to 12 hours or more until a clear supernatant liquor is formed which liquor is removed by decanting, siphoning or similar process.

The solution may also be subjected to a continuous centrifuging operation whereby all undissolved material is removed as a continuous operation and a clarified liquor is obtained.

The clear solution thus obtained should desirably be evaporated under reduced pressure at not over about 135° F. and preferably under 25 inches of vacuum, to approximately 25% to 75% total solids and desirably to about 70% total solids and to a Baumé of 37°.

The evaporating temperature may vary, dependent upon whether vacuum or atmospheric pressure is used. Although it is desirable to use vacuum evaporation, evaporation at atmospheric pressure may also be employed.

The oat extract thus obtained will be of dark brown or tan color, comparatively solid at 75° F. and liquid at 110° F. to 125° F., flowing freely at that temperature, dependent upon the concentration of solids.

Extracts of other cereals will vary in color and consistency following extraction. The extract of maize or hominy is much lighter in color, varying from light yellow to light brown, and blander in flavor and odor, and is more desirable for commercial extraction.

Oats and maize will give an extract of substantially greater potency than the other cereals and the yield obtained will also be greater. In the case of oats, it is preferable to use finely divided whole oats with its full content of oat groats and hulls rather than oat flour. There may also less desirably be utilized the cereal middlings and hulls or other residuary products obtained during the milling of the oats.

The extract thus prepared in concentrated form such as, for example, the concentrated water extract of unbleached yellow or white maize or hominy flour may be added to the skim milk preferably by combining the extract with condensed or concentrated skim milk having 30% or more and desirably about 60% total solids.

For example, a combination may be made comprising the concentrated water extract of maize flour having 70% total solids with condensed skim milk having 30% total solids, and after thorough admixture of the concentrate in the condensed skim milk, the skim milk containing the concentrate may then be subjected to a further drying or concentrating operation.

Where the combination is dried, the drying may take place by either spraying into a heated chamber in order to obtain a spray dried combination or the skim milk-extract combination may be run over hot rollers to obtain a drum dried antioxygenic dry milk powder.

Where it is desired that the finished combination of the skim milk and extract be in substantially liquid or concentrated form, the combination may be placed in cans and sterilized at temperatures of between 220° F. and 245° F. or the combination may be further evaporated in a vacuum pan at a temperature of about 135° F. and under about 25 inches of vacuum until the desired total solids content of 50% to 80% solids has been reached.

It is particularly desirable for the extract to be added to the milk in condensed or concentrated form rather than to apply the extract to already powdered skim milk and then to dry the mixture.

Unconcentrated skim milk may also be used as the extracting medium in place of water, but this is not considered as desirable a procedure as first to prepare the concentrated extract and then to combine with the concentrated milk. Another less desirable procedure is that after the unconcentrated water extract has been removed from the insoluble cereal residues for the skim milk in concentrated form to be added to such unconcentrated extract and then to subject the mixture to a concentration and drying operation.

The extract must be thoroughly admixed with and absorbed upon the individual particles of finished powdered skim milk in order for the desired reaction to take place whereby the anti-oxygenic modified powdered skim milk is obtained.

The amount of the cereal extract to be used on the skim milk will vary within fairly wide limits such as, for example from about 0.02% of the cereal extract and 99.98% of the powdered skim milk on its solids weight basis up to about 50% of the cereal extract and 50% of the skim milk.

The amount of cereal extract and skim milk to be used will depend largely upon the degree of stabilizing activity desired and also upon whether or not a uniform structure is desired in the preparation of the milk dependent upon the use to which the milk is to be put.

A minor amount of the cereal extract is preferred against the weight of the milk and preferably less than 5% of the cereal extract is used and 95% or more of the skim milk on its solids weight basis. For example, it has been found that a particularly desirable combination can be made by using from 95% to 99.5% by weight of the skim milk on its solids basis with from 5% to 0.5% by weight of the cereal extract on its solids weight basis.

Powdered skim milk prepared in this manner will be markedly anti-oxygenic in character as compared with ordinary skim milk and even as compared with the cereal extracts themselves. Ordinary powdered skim milk possesses no antioxygenic properties when utilized at normal temperatures and in many cases shows definite pro-oxygenic tendencies. When utilizing the extract-milk combination, however, there is obtained a marked enhancement in stabilizing activity.

Although the milk solids containing the cereal extract have lesser effectiveness when used at normal temperatures in pure oils and fats such as with the essential oils, glyceride oils or hydrocarbon oils, they are extremely effective when used in aqueous compositions and particularly food compositions which may contain oil globules in the discontinuous phase thereof or dispersed therethrough.

The presence of the cereal extract-milk combination in the aqueous continuous phase of a food composition gives extremely marked protection to the discontinuous fat or oil phase although when added direct to the fat or oil phase it is comparatively much less effective.

The cereal extract-milk combination may therefore be very desirably utilized in the dairy industry, such as for addition to milk, cream, ice cream, cream cheese, condensed and evaporated milk, sherbets, cream in the manufacture of butter, milk for powdering, etc., where it serves to retard materially the development of tallowy, oxidized and rancid flavors.

As an example, cream containing 35% butterfat was contaminated with two p. p. m. (parts per million) of $CuSO_4$. The creams were prepared as follows:

Cream A—containing thoroughly admixed therein 2% of a powdered skim milk-cereal extract combination which had been prepared by combining the concentrated water extract of dry milled unbleached maize flour having 70% total solids with evaporated skim milk having 30% total solids on the basis 98% of the skim milk to 2% of the cereal extract on the solids weight basis, and then drying the combination on a hot roll to produce a substantially dried product.

Cream B—untreated.

The creams were observed at regular intervals after placing at 50° F., the number of + signs indicating the degree of oxidized flavor developing after storage.

|  | Observations after— | | |
| --- | --- | --- | --- |
|  | 24 hours | 48 hours | 72 hours |
| Cream A | − | − | + |
| Cream B | + | + | +++ |

The creams thus prepared may also be utilized in the manufacture of butter. Even though the skim milk-cereal extract combination is completely spread through the aqueous continuous phase of the cream and is not admixed with the discontinuous fat phase contained in globule form in the cream, when the cream is churned in the manufacture of butter and the aqueous continuous phase is entirely removed, nevertheless the butter is substantially stabilized against oxidative deterioration without itself containing any of the skim milk-cereal extract combination.

The skim milk cereal extract combination may also desirably be employed in the manufacture of sausage and particularly fatty sausages which are so subject to oxidative deterioration and rancidity. The dried skim milk-cereal extract combination is desirably utilized either in partial or complete replacement for ordinary dried skim milk used in such products.

The combination may also desirably be employed for curing purposes such as in the curing of bacon, hams, pork, fat backs, and in the curing of fishery products including mackerel, sardines, salmon, tuna fish, etc., and of fruits such as apples, peaches, pears, olives and similar food compositions.

For such curing operations, it is desirable for the skim milk-cereal extract combination to be prepared on the basis of not less than about 10% of the cereal extract and 90% of the skim milk to 50% of the cereal extract and 50% of the skim milk. Where the skim milk-cereal extract combination is used in partial or complete replacement for skim milk normally employed in food compositions subject to oxidation, then smaller proportions of the cereal extract may be employed, down to about 0.5% to 2% of the cereal extract against the weight of the milk.

The modified skim milk may be employed in any desired proportion, but generally is used in amounts that vary from 0.1% to 10%. In the case of such special products as dessert powders, the amount of the modified skim milk that may be employed will be in excess of 10%. Similarly, where it is desired to use the skim milk in complete replacement for ordinary skim milk employed in the manufacture of ice cream, for example, up to 15% of the skim milk-cereal extract combination may be desirably employed, at the same time giving substantial protection to the ice cream against the development of oxidized and tallowy flavors.

In place of water as the solvent for extracting the antioxidants from the finely divided unbleached cereals, and for combination with powdered skim milk, there may less desirably be employed other similar solvents and particularly the alcohols including methyl, ethyl, butyl and propyl alcohols, glycerol, the glycols and glycol ethers and other solvents having the formula XOH where X is a low molecular weight aliphatic group.

Such alcohol soluble extracts are prepared by immersing the finely divided unbleached cereal in from 3 to 10 times its weight of alcohol or similar solvent and agitating vigorously while holding preferably at a slightly elevated temperature, as at 100° F. The alcohol may desirably be acidified to a pH of between 5.0 and 6.7 as when water is used for the solvent.

The alcohol soluble portion is then removed by filtration, siphoning, etc., and the alcohol removed preferably under reduced pressure and at a low temperature as at about 135° F. Such alcohol soluble extracts are combined with condensed or concentrated milk solids in the foregoing manner.

Among the cereals there are also included for water and alcoholic extraction and for combination of such extracts with milk solids, the cereal germs and other cereal by-products, such as corn germ, wheat germ, rice germ, rice polish, etc. These materials are preferably utilized in finely divided, unbleached condition and may, where desired, be deoiled or defatted by expressing or extracting the fixed glyceride oil therefrom after which they are finely divided and subjected to water or alcoholic extraction and absorbed upon the milk solids.

It is important that when the antioxygens are extracted from the cereals or other materials by water or by alcohol, that the antioxygenic substance be in substantially the same chemical condition as in the original materials when extracted. Moreover, the temperature, acidity and components of the extracting liquor should not be such as to cause substantial change or breakdown in the antioxygenic complexes which are removed.

Boiling, fermentation, malting, sprouting, peptinizing, causticizing, dextrinizing, etc., are desirably avoided in the extraction procedures.

The extract itself contains usually both low and high molecular weight water soluble carbohydrates and also organic nitrogen and phosphorous compounds, all of which are present in complex combination and appear to be essential to obtain the desired action.

This modified skim milk preparation shows particularly marked antioxygenic and stabilizing activity when subjected to elevated temperatures in the presence of the oxidizable food composition. For example, where the modified skim milk containing the cereal extract is heated to in excess of 145° F. and preferably above 250° F. in the presence of the materials subject to oxidation, a marked enhancement in antioxygenic and stabilizing activity is obtained.

A heat treatment of as high as 400° F. to 500° F. will give still further stabilizing action or as little as 170° F. will improve the antioxidant activity of the modified skim milk.

Among other food compositions that may be rendered much more stable to oxidative deterioration by adding thereto the combination of milk solids with the water or alcohol soluble extracts of the cereals or cereal germs there are included candies and confections such as toffies, caramels, nougats, milk chocolate, buttercreams, etc., canned foods such as canned soups, creamed soups, milk soups, etc., milk and dairy emulsions, etc.

This application is a continuation in part of application, Serial No. 229,296, filed September 10, 1938, which has matured into Patent No. 2,176,028, and application, Serial No. 249,990 filed January 9, 1939, which has matured into Patent No. 2,176,027.

Having described my invention, what I claim is:

1. A process of stabilizing a glyceride oil containing food composition subject to oxidative deterioration which comprises extracting an unbleached cereal with slightly acidified water, combining and drying said extract with skim milk, and adding a relatively small proportion of said dried combination to the food composition, whereby the food composition is stabilized against oxidative deterioration.

2. A process of stabilizing a food composition subject to oxidative deterioration which comprises extracting unbleached maize with slightly acidified water, combining and concentrating said extract with milk-solids-not-fat, and adding a relatively small proportion of said concentrated combination to the food composition, whereby the food composition is stabilized against oxidative deterioration.

3. A process of stabilizing an organic composition subject to oxidative deterioration which comprises extracting an unbleached cereal material selected from the group consisting of the cereals and cereal germs with a solvent selected from the group consisting of water and alcohol, combining and concentrating said extract with milk-solids-not-fat, and adding a relatively small proportion of said concentrated combination to the organic composition, whereby the organic composition is stabilized against oxidative deterioration.

4. A stabilized glyceride oil containing food composition, which is resistant to oxidative deterioration, treated with a relatively small proportion of a dried combination of skim milk and a slightly acidified water extract of an unbleached cereal.

5. A stabilized organic composition, which is resistant to oxidative deterioration, treated with a relatively small proportion of a concentrated combination of milk-solids-not-fat and an extract of an unbleached cereal material selected from the group consisting of the cereals and cereal germs, said extract being selected from the group consisting of the water and alcohol soluble extracts.

6. The process of making a dried combination of milk-solids-not-fat and cereal antioxygens, suitable for addition in small quantities to organic compositions subject to oxidative deterioration to stabilize such compositions against such deterioration, which comprises the steps of extracting an unbleached cereal material selected from the group consisting of the cereals and cereal germs with a solvent selected from the group consisting of water and alcohol, and combining and concentrating said extract with milk-solids-not-fat.

7. A dried combination of concentrated milk-solids-not-fat and concentrated cereal antioxygens, suitable for addition in small quantities to organic compositions subject to oxidative deterioration to stabilize such compositions against such deterioration, said concentrated cereal antioxygens consisting of the vacuum concentrated antioxygens extracted from an unbleached cereal material selected from the group consisting of the cereals and cereal germs and said extracts consisting of the slightly acidified water and alcohol soluble extracts.

SIDNEY MUSHER.